(12) United States Patent
Clark et al.

(10) Patent No.: US 10,547,927 B1
(45) Date of Patent: *Jan. 28, 2020

(54) SYSTEMS AND METHODS FOR PROCESSING AN AUDIO SIGNAL FOR REPLAY ON STEREO AND MULTI-CHANNEL AUDIO DEVICES

(71) Applicant: Mimi Hearing Technologies GmbH, Berlin (DE)

(72) Inventors: Nicholas R. Clark, Royston (GB); Christoph Omid Hohnerlein, Berlin (DE)

(73) Assignee: Mimi Hearing Technologies GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,990

(22) Filed: Jul. 27, 2018

(51) Int. Cl.
*H04R 1/10* (2006.01)
*H04W 4/80* (2018.01)
*H04R 25/00* (2006.01)

(52) U.S. Cl.
CPC .............. *H04R 1/10* (2013.01); *H04R 25/48* (2013.01); *H04W 4/80* (2018.02); *H04R 2420/07* (2013.01)

(58) Field of Classification Search
CPC .......... H04R 1/10; H04R 25/00; H04R 5/033; H04R 1/24; G10L 19/008; G10L 19/02; H04S 2400/01; H04S 3/008

USPC ................. 381/316, 23.1, 1, 119, 27, 17, 80
See application file for complete search history.

(56) References Cited

U.S. PATENT DOCUMENTS

| | | | |
|---|---|---|---|
| 2016/0225387 A1* | 8/2016 | Koppens | G10L 21/0364 |
| 2018/0090151 A1* | 3/2018 | Dick | G10L 19/008 |

* cited by examiner

*Primary Examiner* — Melur Ramakrishnaiah
(74) *Attorney, Agent, or Firm* — Polsinelli PC

(57) ABSTRACT

Disclosed are technologies for processing a surround sound audio signal. The center channel is processed to generate a processed center channel. For each pair of corresponding left and right audio channels, mid and side channel signals are generated by taking the sum and difference of the pair, respectively. The side channel is outputted to a first signal pathway that features a dynamic range compressor. The mid channel is outputted to a second signal pathway and spectrally decomposed into a plurality of sub-band signals. Each sub-band signal is compressed by a dynamic range compressor and transmitted to a gain stage. The compressed sub-band signals are outputted from the gain stage and recombined. The outputs of the first and second signal pathways are then recombined and decoded to produce processed left and right audio signals. Each pair or processed left and right audio signals are output along with the processed center channel.

20 Claims, 10 Drawing Sheets

7.1 Surround Sound
(3 Channels Processed)

5.1 Surround Sound
(3 Channels Processed)

7.1 Surround Sound
(7 Channels Processed)

5.1 Surround Sound
(5 Channels Processed)

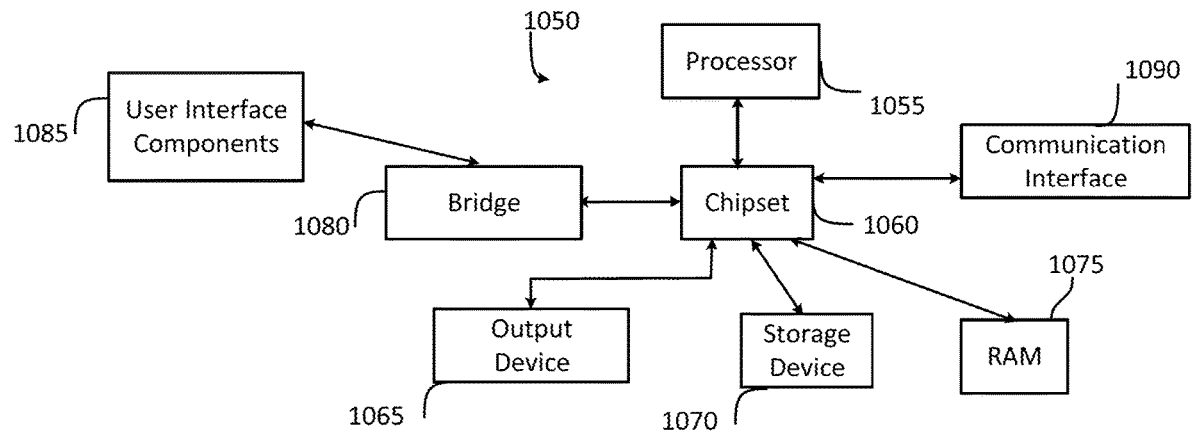
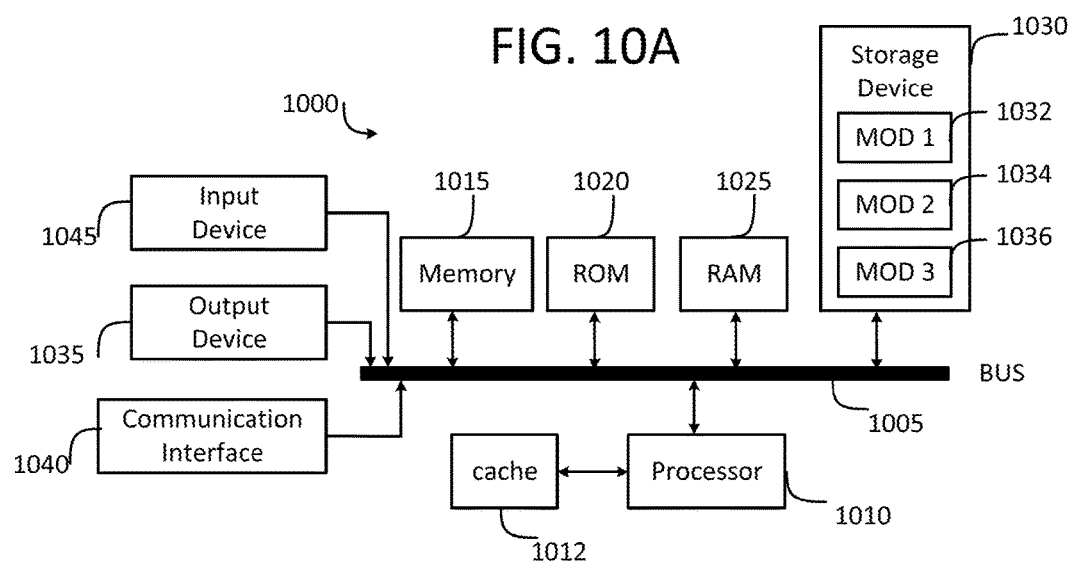

SYSTEMS AND METHODS FOR PROCESSING AN AUDIO SIGNAL FOR REPLAY ON STEREO AND MULTI-CHANNEL AUDIO DEVICES

TECHNICAL FIELD

The present disclosure pertains to digital signal processing (DSP), audio engineering, short range wireless devices and wearable technologies, and more specifically pertains to systems and methods for processing an audio signal for replay on stereo and/or multi-channel audio devices, for example by providing computationally efficient and high-quality sound augmentation on the audio device.

BACKGROUND

Traditional hearing aid processors operate independently within a user's left and right ear (see e.g. U.S. Pat. Nos. 8,005,246; 8,406,442). As each hearing aid only receives a mono signal, there is no need to perform centralized or stereo processing on an incoming sound stream, which is simply processed locally by the hearing aid or mono receiver. However, the advent of wireless audio transmission technologies such as Bluetooth has enabled audio processing to become centralized on one core processor, allowing for more sophisticated stereo sound processing techniques. In these instances, a stereo signal is received at a single decoder and the decoder extracts a multichannel audio signal from the received stereo signal (see e.g. U.S. Pat. No. 9,755,704). The multichannel audio signal audio data is then processed using a stereo augmentation process and outputted to the appropriate speaker. Relative to a conventional hearing aid, here the augmentation happens as part of one process, not two independent processes.

As more features have been added to the suite of capabilities on smart devices and hearing wearables ("hearables") employing Bluetooth or other similar short-range wireless interconnection methods, strains on processing power have become increasingly apparent. Sound augmentation is a computationally expensive process and there exists a need to devise efficient means to perform this process while maintaining the integrity of the hearing experience for the user. Accordingly, it would be desirable to provide computationally efficient and high-quality sound augmentation processing methods for stereo audio devices.

SUMMARY

In order to create computationally efficient sound augmentation methods for stereo audio devices, the present disclosure avoids the conventional limitation of having to fully process both left and right audio channels on a single or multi-core processor. In general, the present disclosure features systems and methods for replay on a stereo audio device. Methods of the present disclosure may be methods for providing computationally efficient and high-quality sound augmentation processing. The method includes a) encoding a left and right audio signal as a mid and side channel. This may be done by taking the sum and the difference of the left and right audio signals, respectively. The method further includes b) outputting the side channel to a first signal pathway, wherein the first signal pathway features a dynamic range compressor (DRC). The first signal pathway may further include dividing the signal using a high-pass and a low-pass filter, wherein the high-pass sub-band signal is subjected to a DRC and subsequently recombined with the low-pass sub-band signal (which is not subjected to a DRC). In one embodiment, the high-pass filter attenuates frequencies below 800 Hz and the low-pass filter attenuates frequencies above 800 Hz, although other frequencies and frequency limits can be employed without departing from the scope of the present disclosure. The method further includes c) outputting the mid channel to a second signal pathway, wherein the processing in the second signal pathway includes i) performing a spectral decomposition on the mid channel signal into a plurality of sub-band signals using a bandpass filter. Subsequently, ii) each sub-band signal is provided to a dynamic range compressor, compressed and outputted to a gain stage. The processed sub-band signals, also referred to herein as gain-adjusted sub-band signals, are then iii) outputted from the respective gain stages and recombined. The method further includes, d) recombining the outputs of the first and second signal pathways and decoding the combined first and second signal pathways into left and right audio signals. In some embodiments, the side pathway is delayed by the same amount of delay as is induced in the mid pathway. In another embodiment, a phase correction network is employed in the side signal pathway to match the phase distortion induced in the processing pathway. The respective left and right audio signals are then e) outputted.

In another example embodiment for providing computationally efficient and high-quality sound augmentation processing for users, the method comprises further subdividing the mid channel pathway into a processed and unprocessed pathway to enable dry/wet mixing of the mid channel pathway. The method includes a) encoding a left and right audio signal as a mid and side channel. This may be done by taking the sum and the difference of the left and right audio signals, respectively. The method further includes b) outputting the side channel to a first signal pathway, wherein the first signal pathway features a dynamic range compressor (DRC). The first signal pathway may in some embodiments include dividing the signal using a high-pass filter and a low-pass filter, wherein the high-pass sub-band signal is subjected to at least one DRC before being subsequently recombined with the low-pass sub-band signal. In one embodiment, the high-pass filter attenuates frequencies below 800 Hz and the low-pass filter attenuates frequencies above 800 Hz, although other frequencies and frequency limits can be employed without departing from the scope of the present disclosure. The method further includes c) outputting the mid channel to a second signal pathway, which is then further subdivided into a processed and unprocessed pathway. The processing in the mid channel processing pathway includes i) performing a spectral decomposition on the mid channel signal into a plurality of sub-band signals using a bandpass filter. Subsequently, ii) each sub-band signal is provided to a dynamic range compressor, compressed and outputted to a gain stage. The processed sub-band signals, also referred to herein as gain-adjusted sub-band signals, are then iii) outputted from the respective gain stage and recombined. The processed and unprocessed mid channel pathways are then recombined at a ratio. The ratio may be a user defined ratio. The method further includes, d) recombining the outputs of the first and second signal pathways and decoding the combined first and second signal pathways into left and right audio signals. In some embodiments, the unprocessed mid pathway is delayed by the same amount of delay as is induced in the processed mid pathway. In another embodiment, a phase correction network is employed in the unprocessed mid signal pathway to match the phase distortion induced in the mid processing pathway.

Similarly, in some embodiments, the side pathway is delayed by the same amount of delay as is induced in the mid pathway (either processed or unprocessed). In another embodiment, a phase correction network is employed in the side signal pathway to match the phase distortion induced in the mid signal pathway. The respective left and right audio signals are then e) outputted.

In another example embodiment for providing computationally efficient and high-quality sound augmentation processing for users, the method comprises subdividing both mid and side channel pathways into processed and unprocessed signal pathways such that dry/wet mixing may be done separately on the mid and side channels. The method includes a) encoding a left and right audio signal as a mid and side channel. This may be done by taking the sum and the difference of the left and right audio signals, respectively. The method further includes b) outputting the side channel to a first signal pathway, which is then subdivided into a processed and unprocessed signal pathway. The processed side channel signal pathway features a dynamic range compressor (DRC). The first signal pathway may optionally include dividing the signal using a high-pass and low-pass filter, wherein the high-pass sub-band signal is subjected to DRC and subsequently recombined with the low-pass sub-band signal. In one embodiment, the high-pass filter attenuates frequencies below 800 Hz and the low-pass filter attenuates frequencies above 800 Hz. Subsequently, the processed and unprocessed side channel signal pathways are ultimately recombined at a ratio. The ratio may be a user defined ratio. The method further includes c) outputting the mid channel to a second signal pathway, which is then further subdivided into a processed and unprocessed pathway. The processing in the mid channel processing pathway includes i) performing a spectral decomposition on the mid channel signal into a plurality of sub-band signals using a bandpass filter. The bandpass filter may be a finite impulse response filter. Subsequently, ii) each sub-band signal is provided to a dynamic range compressor, compressed and outputted to a gain stage. The processed sub-band signals, also referred to herein as gain-adjusted sub-band signals, are then iii) outputted from the respective gain stage and recombined. The processed and unprocessed mid channel pathways are then recombined at a ratio. The ratio may be a user defined ratio. The method further includes, d) recombining the outputs of the first and second signal pathways and decoding the combined first and second signal pathways into left and right audio signals. In some embodiments, the unprocessed mid and side pathways are delayed by the same amount of delay as is induced in the processed mid and side pathways, respectively. In another embodiment, a phase correction network is employed in one or more of the unprocessed mid and side signal pathways to match the phase distortion induced in one or more of the processed mid and side pathways, respectively. Similarly, in some embodiments, the recombined side pathway is delayed by the same amount of delay as is induced in the recombined mid pathway. In another embodiment, a phase correction network is employed in the recombined side signal pathway to match the phase distortion induced in the recombined processing pathway. The respective left and right audio signals are then e) outputted.

In another example embodiment for providing computationally efficient and high-quality sound augmentation processing for users, the method comprises subdividing the left and right channels before performing mid/side processing such that dry/wet mixing may be done when the left and right channels are outputted from mid/side processing. The method includes a) splitting left and right channel signals each into left and right processed and unprocessed signal pathways, respectively. The method further includes b) encoding the left and right audio signals in the processed pathway as a mid and side channel. This may be done by taking the sum and the difference of the left and right audio signals, respectively. The method further includes c) outputting the side channel to a first signal pathway, wherein the first signal pathway features a dynamic range compressor (DRC). The first signal pathway may in some embodiments include dividing the signal using a high-pass and low-pass filter, wherein the high-pass sub-band signal is subjected to one or more DRCs and subsequently recombined with the low-pass sub-band signal. In one embodiment, the high-pass filter attenuates frequencies below 800 Hz and the low-pass filter attenuates frequencies above 800 Hz. The method further includes c) outputting the mid channel to a second signal pathway, wherein the processing in the second signal pathway includes i) performing a spectral decomposition on the mid channel signal into a plurality of sub-band signals using a bandpass filter. Subsequently, ii) each sub-band signal is provided to a dynamic range compressor, compressed and outputted to a gain stage. The processed sub-band signals, also referred to herein as gain-adjusted sub-band signals, are then iii) outputted from the respective gain stages and recombined. The method further includes, d) recombining the outputs of the first and second signal pathways and decoding the combined first and second signal pathways into left and right audio signals. In some embodiments, the unprocessed left and right pathways are delayed by the same amount of delay as is induced in the left and right processing pathways, respectively. In another embodiment, a phase correction network is employed in the unprocessed left and right signal pathways to match the phase distortion induced in the processed left and right pathways, respectively. Similarly, in some embodiments, the side pathway is delayed by the same amount of delay as is induced in the mid pathway. In another embodiment, a phase correction network is employed in the recombined side signal pathway to match the phase distortion induced in the recombined mid signal pathway. Subsequently e), the respective left and right audio signals are combined with the unprocessed left and right audio signals, respectively.

Unless otherwise defined, all technical terms used herein have the same meaning as commonly understood by one of ordinary skill in the art to which this technology belongs.

The term 'audio device', as used herein, is defined as any device that outputs audio, including, but not limited to: mobile phones, computers, televisions, hearing aids, hearables, headphones, embedded audio systems and/or sound reproduction systems. For example, embedded audio systems and/or sound reproduction systems can include, but are not limited to, various different arrangements and configurations of multi-channel speaker systems, such as the five or seven channel surround sound systems commonly available to both consumers and professionals.

The phrase 'dynamic range compression' or DRC', as used herein, is defined as an audio process that reduces the dynamic range of an audio signal. A compressor may either have a feedforward or feedback design. Dynamic range compression may occur instantaneously, or the rate may be controlled through adjustment of the compressor's attack and release time constants.

The phrase 'sound augmentation', as used herein, is defined as any process that splits a signal into a plurality of frequency bands and then applies dynamics processing to each band to meet the hearing needs of the user.

The phrase 'bandpass filter', as used herein, is defined as a device that passes frequencies within a certain range and attenuates frequencies outside that range.

The phrase 'mid channel', as used herein, refers to centrally correlated audio information and represents a summation of left and right audio channels.

The phrase 'side channel', as used herein, refers to centrally anti-correlated audio information and represents a subtraction of left and right audio channels.

The phrase 'computer readable storage medium', as used herein, is defined as a solid, non-transitory storage medium including, but not limited to: flash memory or various forms of disk storage. It may also be a physical storage place in a server accessible by a user, e.g. to download for installation of the computer program on a user device or for cloud computing.

BRIEF DESCRIPTIONS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understand that these drawings depict only exemplary embodiments of the disclosure and are not therefore to be considered to be limiting of its scope, the principles herein are described and explained with additional specificity and detail through the use of the accompanying drawings in which:

FIG. 10A illustrates a conventional system bus computing system architecture in which one or more aspects of the present disclosure can be employed; and FIG. 10B illustrates an example computer system having a chipset architecture in which one or more aspects of the present disclosure can be employed.

DETAILED DESCRIPTION

Figure 1:
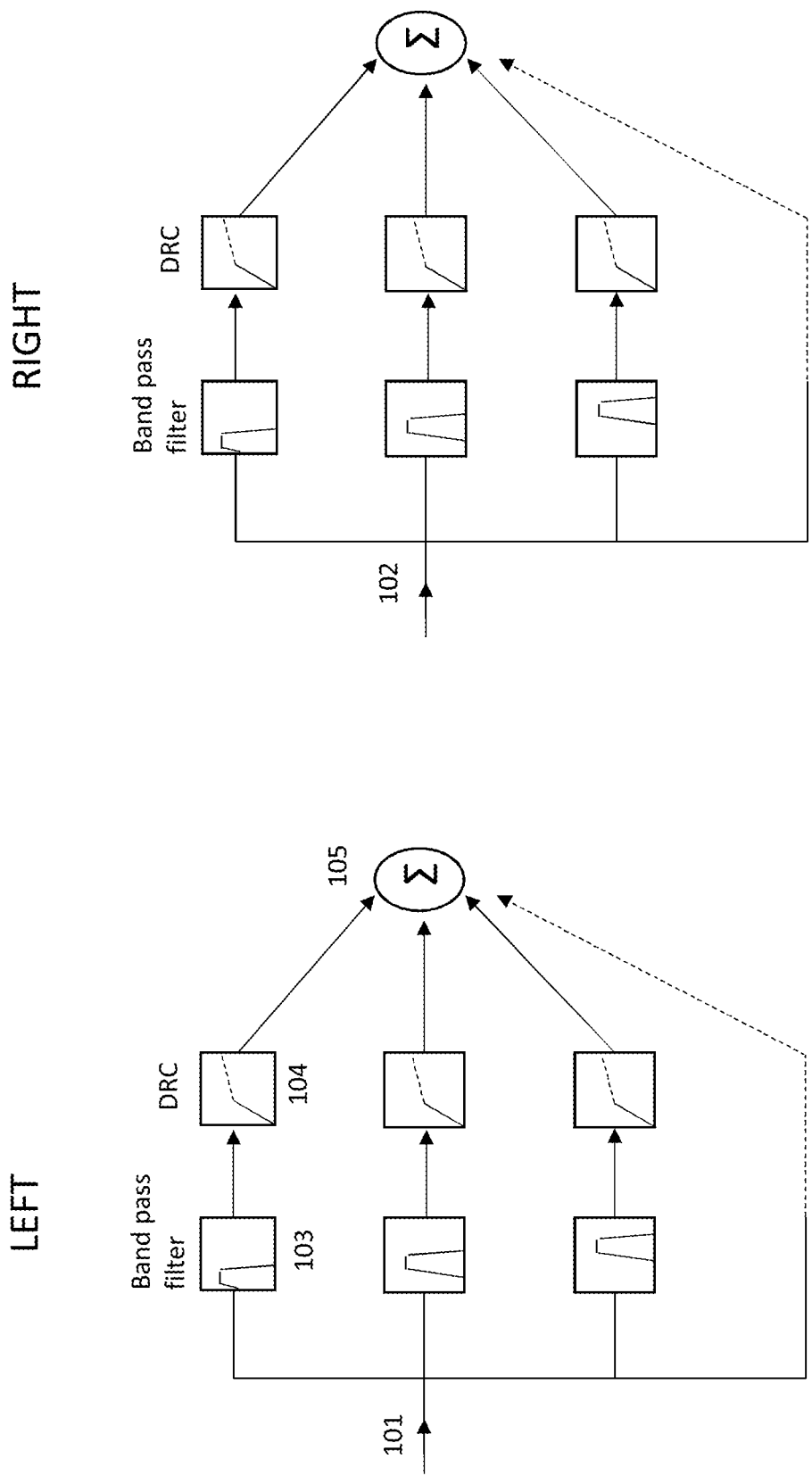
FIG. 1 illustrates a typical hearing aid circuit, wherein left and right channels independently perform sound augmentation processing.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

In order to create computationally efficient and high-quality sound augmentation methods for stereo audio devices, the present disclosure avoids the intensive computational workload required in having to process both left and right channels on a single or multi-core processor. Conventionally, separate processors are used in the left and right hearing aids of users, which are then independently employed to process the incoming mono audio signal to each individual hearing aid (e.g., see exemplary diagram of conventional left and right hearing aids in FIG. 1). However, with the advent of short-range wireless interconnection methods, communication between left and right hearing components has become increasingly possible, allowing for, as disclosed herein, the processing of sound with improved quality. Additional benefits of such sound processing include improved sound localization as well as reduced hearing strain for users. Enhanced interconnection data speeds further enable the move to a single or multi-core processor for sound processing in which stereo is received at a single decoder, which then extracts a multichannel audio signal from the data for subsequent output to the appropriate speaker or channel (e.g., after processing has been applied as desired or needed).

Although the following description and examples of the present disclosure are presented with reference to a stereo audio signal (e.g. left and right channels), it is appreciated that aspects of the present disclosure can be extended to encompass a greater number of audio channels without departing from the scope of the present disclosure. For example, many surround sound systems employ five or seven channels, each of which can be processed according to the various techniques described below, wherein the mid and side channel pathways are generated over some combination of the five or seven surround sound channels rather than being generated over just left and right stereo channels.

As more features have been added to the suite of capabilities on Bluetooth enabled smart devices and wearables (including noise cancellation, enhanced speech processing, personalized audio processing and further AR features), strains on processing have become increasingly apparent. Sound augmentation is a computationally expensive process and there exists a need to devise efficient means to perform this process while maintaining the integrity of the hearing experience for the user. In this respect, separating out the critical components of an audio signal for sound augmentation while maintaining a balanced sound is an important functionality.

Mid and side channel processing has been used by artists in studio recording engineering to independently apply effects or other processes to spatial audio that exists mostly in the middle of the sound stage (i.e. the 'mids'), or mostly at the extremes (i.e. the 'sides') of the sound stage. For instance, to enhance the room sound of drums without muddying the mix, artificial reverb can be added to the side channel only.

Figure 2:
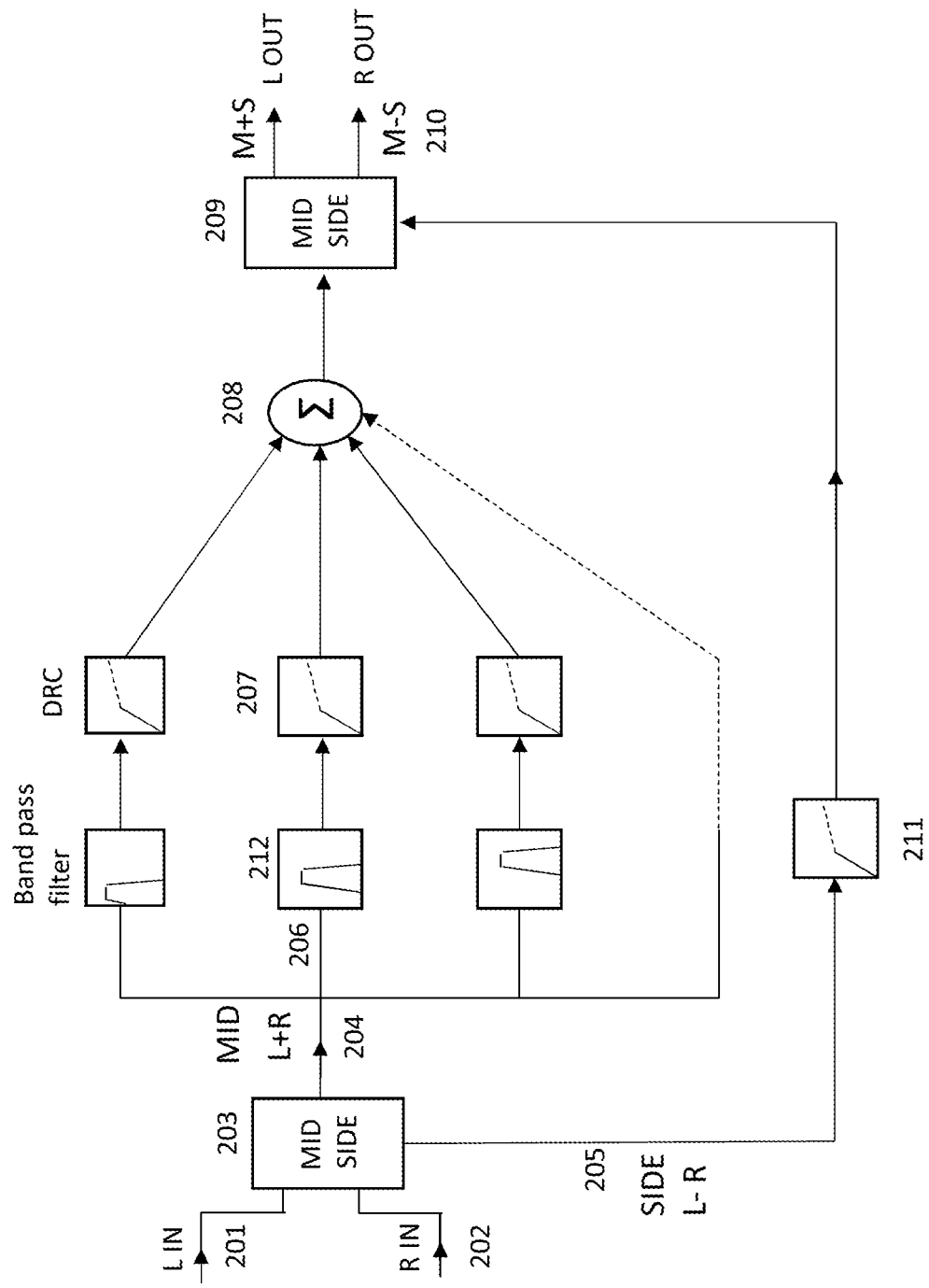
FIG. 2 illustrates an exemplary embodiment of a computationally efficient mid/side channel circuit, wherein only the mid channel performs sound augmentation processing and the side channel contains a simple, full band DRC.

FIG. 2 illustrates a schematic diagram of an exemplary embodiment of the present disclosure, portraying a novel implementation of mid/side processing in order to optimize sound augmentation in a single or multi-core stereo processor, although it is noted that multi-channel (e.g., five or seven channel) surround sound processing may also be performed without departing from the scope of the present disclosure With respect to the portrayed stereo processing, by solely processing the mid channel with relatively computationally expensive sound augmentation processing (most of which is due to spectral decomposition), nearly 2X savings in computational workload are incurred relative to the configuration of FIG. 1, where sound augmentation is performed twice (once each in the left and right channel). In this new implementation, an input left audio signal 201 and an input right audio signal 202 are provided at a processing input to a mid/side encoder 203, which transforms the left and right audio signals 201, 202 into mid/side encoded signals 204, 205. In particular, by subtracting left 201 and right 202 audio signals, a side channel is encoded and outputted to a side signal pathway 205. Side signal pathway 205 is then provided to full band DRC (Dynamic Range Compressor) 211, compressed and then outputted to mid/side decoder 209. Full band compression of the side channel allows for lifting the energy of the side channels relative to the mid channel, such that the loudness relationship between the mid and the sides is closer to that of the original signal. Advantageously, this has the effect of restoring the sound stage with minimal processing power. Without compression of the side channel, the stereo image collapses into the center, leading to poor sound quality and a loss of stereo information.

By adding left 201 and right 202 audio signals, a mid channel is encoded and outputted to mid signal pathway 204. This pathway is then spectrally decomposed (shown at a junction 206 representing a spectral decomposer) into a plurality of frequency bands (e.g., into a plurality of sub-band signals, each sub-band signal having a respective frequency band). In some embodiments, spectral decomposition may be performed by one or more input bandpass filters 212, for example, wherein each bandpass filter will pass only the desired sub-band signal for its pathway. Each respective frequency band is provided at a compression input (i.e. represented as the distinct horizontal branches from junction point 206 in FIG. 2), for subsequent compression by a respective DRC 207. The respective DRCs 207 can be identical for each compression input branch or sub-band frequency, or one or more of the respective DRCs 207 can be configured with different or unique parameters as compared to remaining ones of the respective DRCs 207. Once compressed, the compressed mid sub-band signal may be further modulated by a gain (i.e. by one or more gain stages, not shown), to thereby yield corresponding gain-adjusted sub-band signals. Finally, each sub-band signal is recombined at an operator 208 to thereby form a full wide audio band mid channel signal to be provided to a mid/side decoder 209. Each frequency band may have its own, distinct parameters, e.g. gain, DRC threshold, DRC ratio, etc. The processed mid and side channel signals that are provided to the mid/side decoder 209 are decoded and subsequently, the left and right audio channels are outputted at 210. The output at 210 can be generated via decoder 209, which adds the mid and side channels together to generate the left channel output and subtracts the mid and side channels to generate the right channel output. In embodiments where multi-channel sound processing is desired, rather than the stereo sound processing that is shown, each channel could be input to mid/side encoder 203 which would generate the corresponding mid and side channels for processing as described above, with the difference being that the mid channel comprises a summation over all (or some combination) of the multiple channels and the side channel comprises a subtraction over all (or some combination) of the multiple channels. In some embodiments, when only a portion of the total channels present are used to encode the mid or side channel, the same portion can be used to encode the corresponding side or mid channel, respectively.

Figure 3:
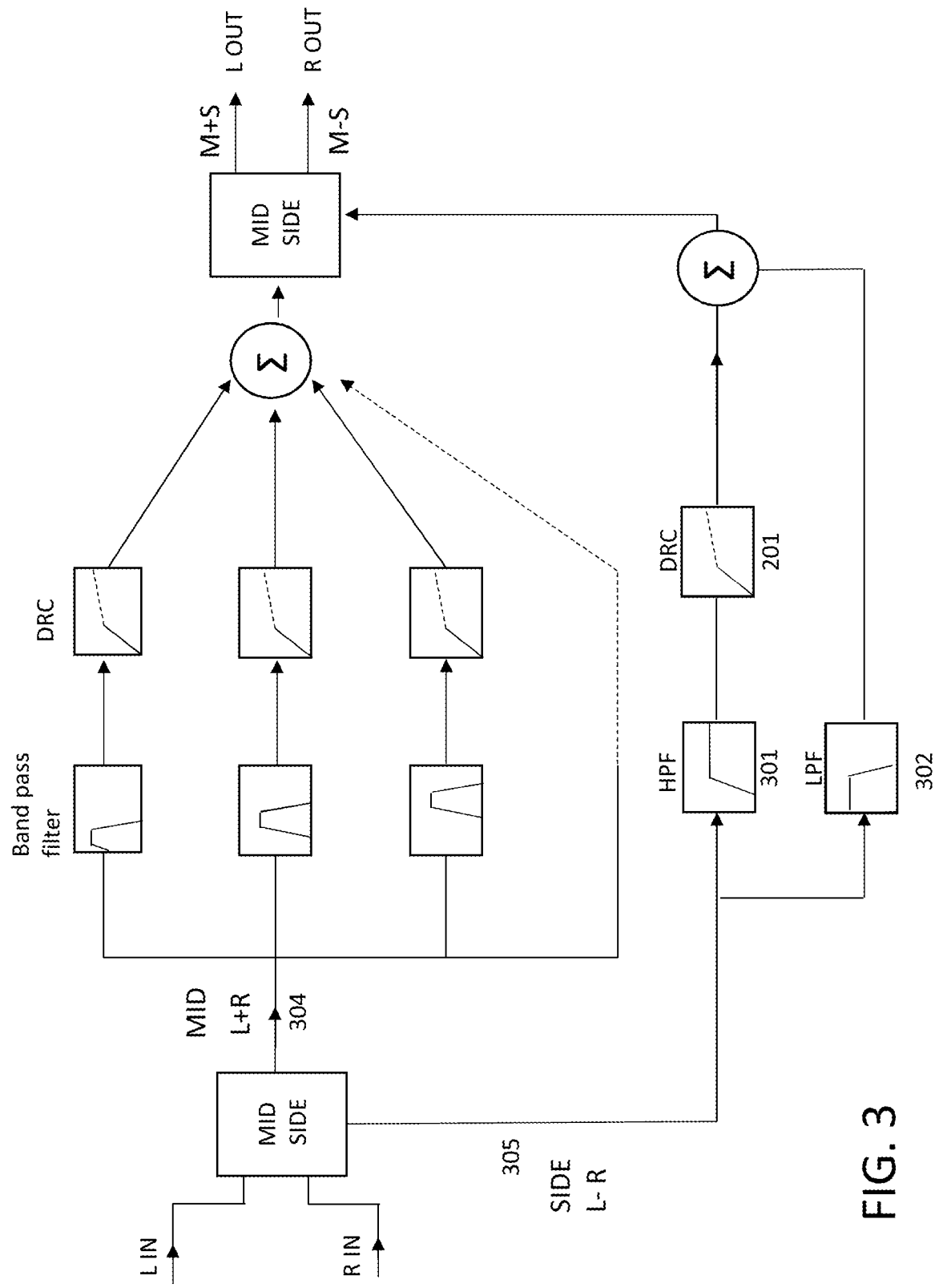
FIG. 3 illustrates a further embodiment of FIG. 4, in which the side channel additionally contains a high-pass filter and a low-pass filter.

FIG. 3 depicts an embodiment of the present disclosure in which the mid/side channel processing is similar to that of FIG. 2. However, in FIG. 3, the side channel pathway 305 additionally provides for a high-pass filter (HPF) 301 preceding DRC 201 as well as a low-pass filter (LPF) 302. The high-pass sub-band signal from HPF 301 is compressed by DRC 201 and subsequently recombined with the unprocessed low-pass sub-band signal from LPF 302. As humans only use level differences above approximately 800 Hz for sound localization purposes, compressing frequencies above 800 Hz may lead to further improvements in sound quality with little additional processing power being expended. In embodiments where multi-channel sound processing is desired rather than the stereo sound processing that is shown, each one of the multiple channels could be input to mid/side encoder, which would generate the corresponding mid and side channels for processing as described above. For example, five or seven surround sound channels might be input into the mid/side encoder, which would still output one mid channel on pathway 304 and one side channel on pathway 305, with the difference being that the mid channel now comprises a summation over all (or some combination) of the multiple surround sound channels and the side channel comprises a subtraction over all (or some combination) of the multiple surround sound channels. In some embodiments, when only a portion of the total channels present are used to encode the mid or side channel, the same portion can be used to encode the corresponding side or mid channel, respectively.

Figure 4:
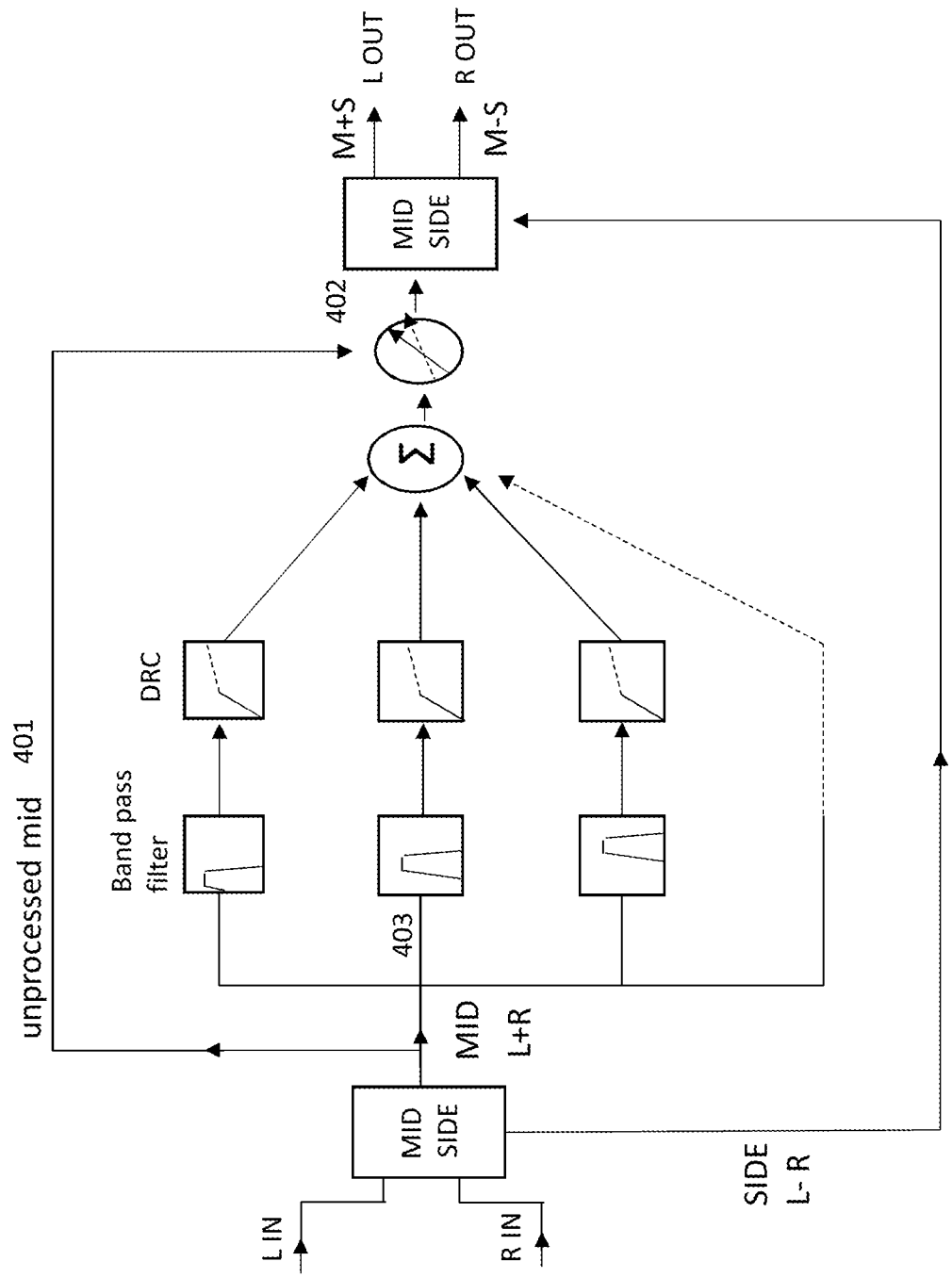
FIG. 4 illustrates a further embodiment of FIG. 2, in which the mid channel is separated into a processed and unprocessed pathway, and then combined at a ratio.

FIG. 4 depicts another embodiment of the present disclosure, which allows for dry/wet mixing of mid channel signal pathway 204. In this instance, pathway 204 is split into an unprocessed mid pathway 401 and a processed mid pathway 403, which are subsequently recombined at a desired or pre-defined ratio at operator 402. This ratio may be a user defined ratio. In some embodiments, the ratio can be stored in memory as a preset, for example where a preset corresponds to a certain processing profile and/or a certain hearing profile to which the presently disclosed processing is directed. This method of dry/wet mixing, also known as parallel compression, provides the benefit of allowing the user to mix 'dry' unprocessed or slightly processed sound with 'wet' processed sound, enabling customization of processing based on subjective preference. For example, this enables hearing impaired users to use a high ratio of heavily processed sound relative to users with moderate to low hearing loss, who may prefer to use a low ratio of processed sound. Furthermore, by reducing the dynamic range of an audio signal by bringing up the softest sounds rather than reducing the highest peaks, additional audible detail is provided to the outputted sound. In embodiments where multi-channel sound processing is desired rather than the stereo sound processing that is shown, each one of the multiple channels could be input to mid/side encoder, which would generate the corresponding mid and side channels for processing as described above. For example, five or seven surround sound channels might be input into the mid/side encoder, which would still output one mid channel on pathway 403 and one side channel on the corresponding side channel pathway, with the difference being that the mid channel now comprises a summation over all (or some combination) of the multiple surround sound channels and the side channel comprises a subtraction over all (or some combination) of the multiple surround sound channels. In some embodiments, when only a portion of the total channels present are used to encode the mid or side channel, the same portion can be used to encode the corresponding side or mid channel, respectively.

Figure 5:
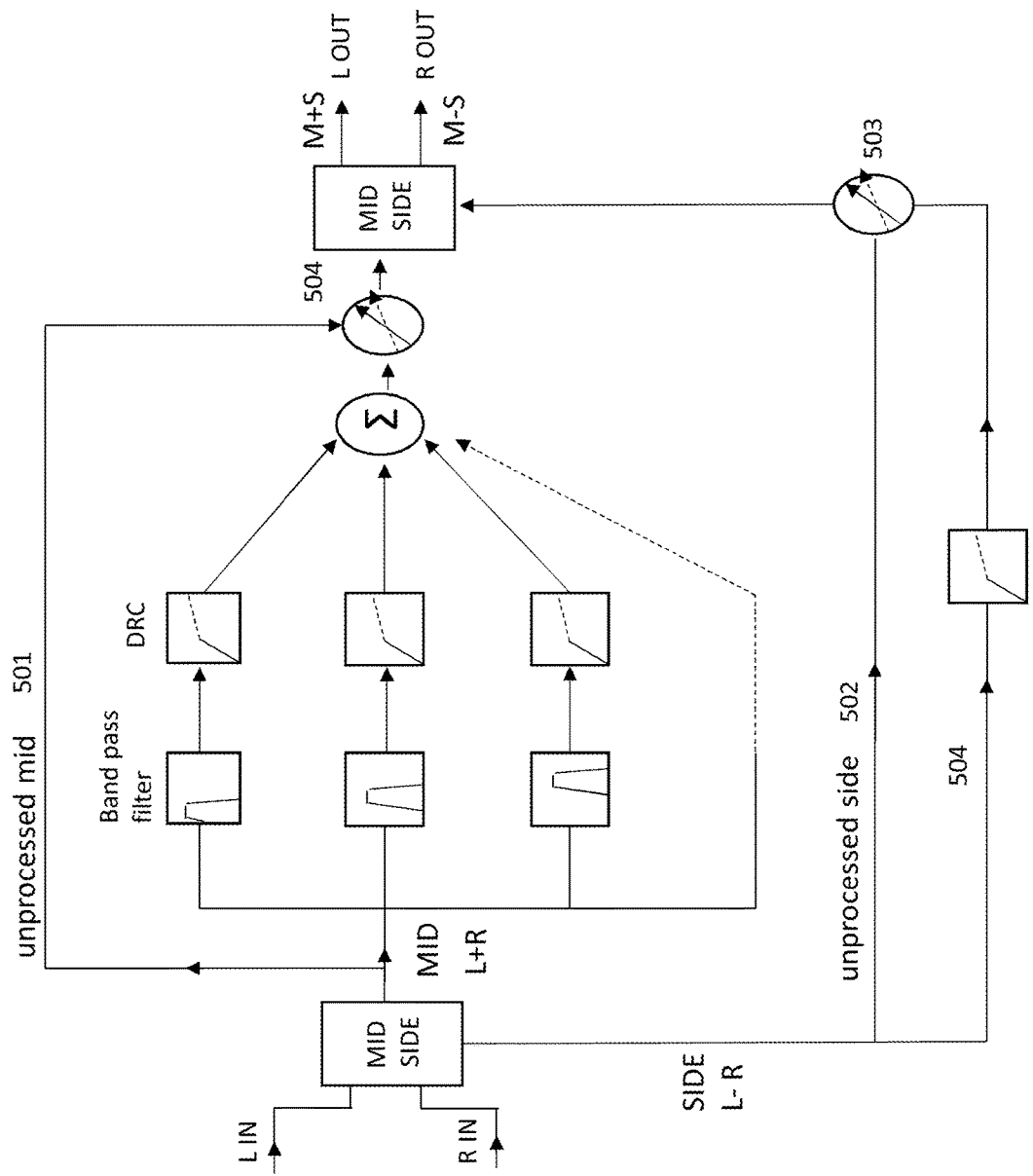
FIG. 5 illustrates a further embodiment of FIG. 4, in which the mid and side channels are separated into processed and unprocessed pathways, and then combined at a ratio.
Figure 6:
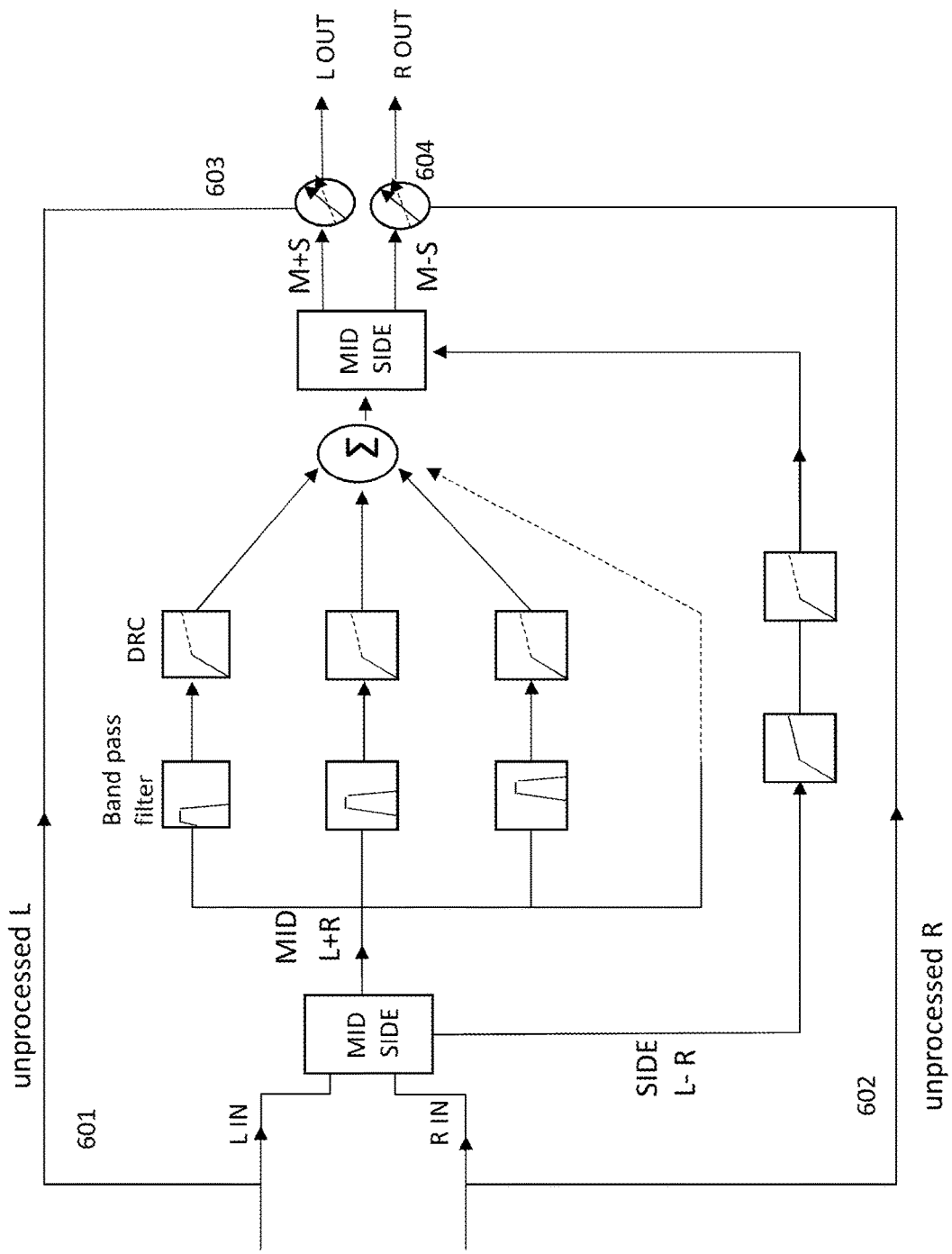
FIG. 6 illustrates a further embodiment, in which the left and right channels are split into processed and unprocessed pathways, and then combined at a ratio.

FIG. 5 depicts another embodiment of the present disclosure. Similar to FIG. 4, the configuration of FIG. 5 allows for parallel compression of processed and unprocessed (or lightly processed) signal pathways via dry/wet mixing. However, unlike FIG. 4 which only provided dry/wet mixing to the mid channel pathway, the configuration of FIG. 5 additionally allows for dry 502/wet 505 mixing of the side channel pathway by operator 503. This allows for even greater customization of the subjective hearing experience for the end user. Similarly, FIG. 6 achieves the same effect as FIG. 5—but instead, relies on a different configuration that splits the processed and unprocessed 601, 602 signal pathways before mid/side channel encoding is performed at the mid/side encoder, whereas FIGS. 4 and 5 split the processed and unprocessed signal pathways after mid/side channel encoding by the mid/side encoder. In FIG. 6, the processed left and right pathways are ultimately recombined at operators 603, 604 with the unprocessed left and right channel signals, respectively, and the consequent mix is then outputted. Within the above described illustrations, the sound augmentation configuration in FIGS. 1-6 comprises a multiband compressive system generally featuring bandpass filters and dynamic processors. Other sound augmentation configurations that build on top of this general framework, such as those described in commonly owned EP18178873.8 are also applicable.

In some embodiments, where multi-channel sound processing is desired rather than the stereo sound processing that is shown in FIG. 6, mid/side encoding can be performed over the entire set of multiple input channels (e.g. five or seven surround sound channels) to generate one mid channel and one side channel for processing as normal, i.e. as explained above with respect to at least FIG. 6. However, rather than having an unprocessed left signal pathway 601 and an unprocessed right signal pathway 602, an unprocessed signal pathway could instead be provided for each one of the surround sound channels that is input into the mid/side encoder. In other words, although not shown, FIG. 6 could be adapted to multi-channel processing by adding a corresponding number of additional unprocessed signal pathways for each of the surround sound channels, and adjusting the recombination operators 603, 604 to perform recombination over all of the unprocessed surround sound channels, such that the final output is a number of processed surround sound channels (e.g. five or seven) that is equal to the input number of unprocessed surround sound channels to the mid/side encoder.

Figure 7B:
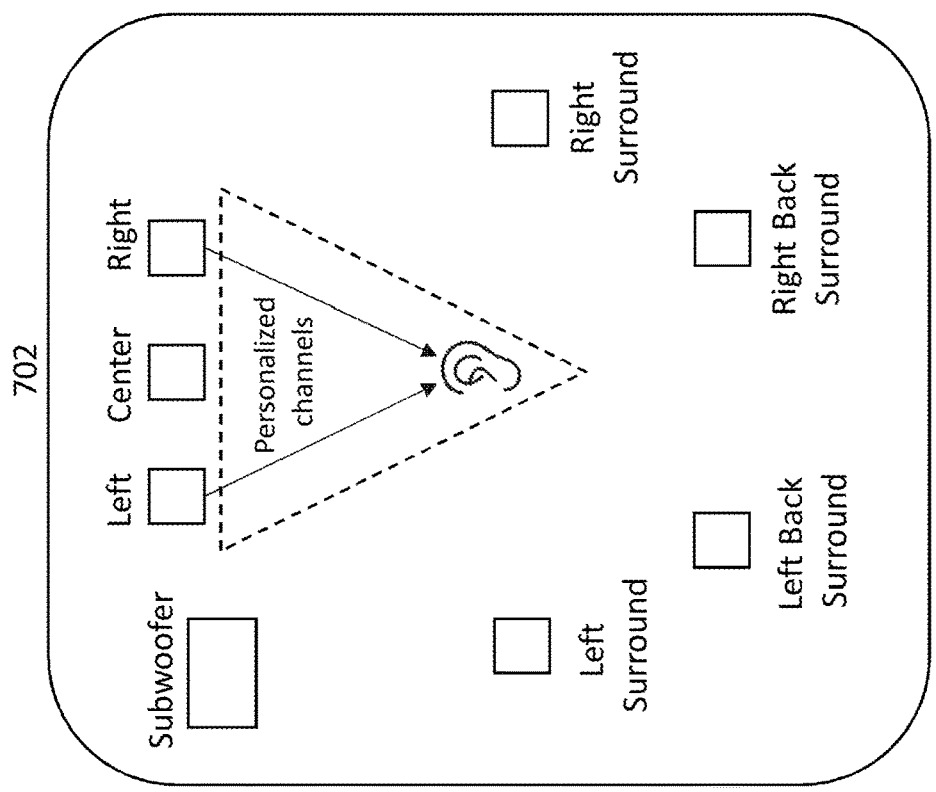
FIG. 7B illustrates a 7.1 surround sound processing configuration according to one or more aspects of the present disclosure.
Figure 7A:
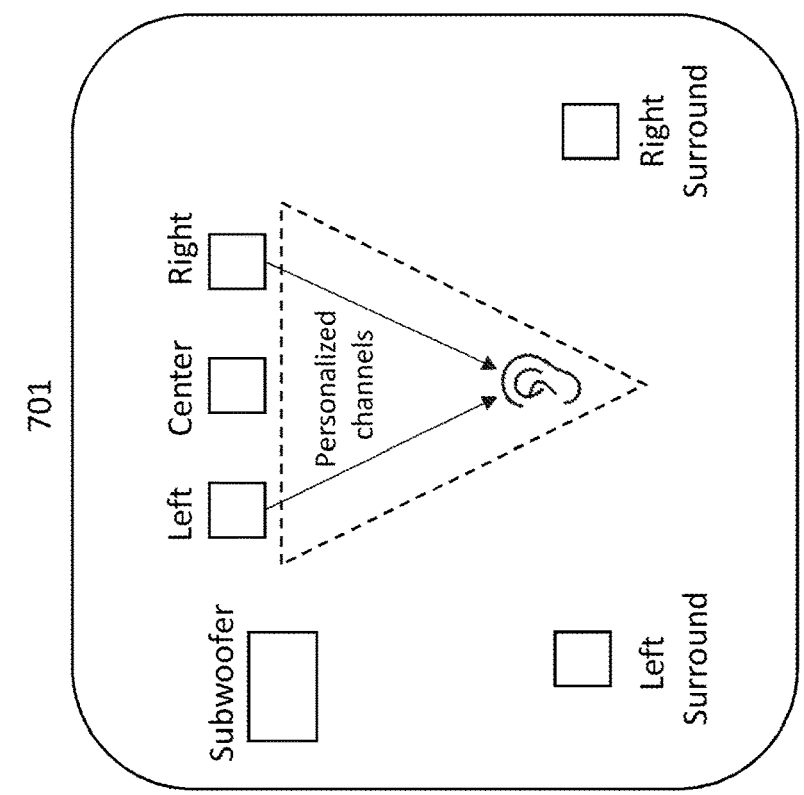
FIG. 7A illustrates a 5.1 surround sound processing configuration according to one or more aspects of the present disclosure.

FIGS. 7A and 7B depict exemplary multi-channel (e.g. surround sound) audio processing according to one or more aspects of the present disclosure. In particular, FIG. 7A depicts an environment 701 configured with 5.1 surround sound and FIG. 7B depicts an environment 702 configured with 7.1 surround sound. For the purposes of the following discussion, 5.1 surround sound can be taken to consist of a total of six different audio channels—5 full-bandwidth channels and 1 low-frequency (subwoofer) channel, hence 5.1. Likewise, 7.1 surround sound can be taken to consist of a total of eight different audio channels—7 full-bandwidth channels and 1 low-frequency (subwoofer) channel, hence 7.1. However, it is appreciated that various other surround sound configurations (11.1, 16.2, etc.) as would be appreciated by one of ordinary skill in the art may be utilized without departing from the scope of the present disclosure.

With respect to both the 5.1 surround sound audio processing of environment 701 of FIG. 7A and the 7.1 surround sound audio processing of environment 702 of FIG. 7B, only three channels are processed. In some embodiments, the center channel can be fully processed according to one or more desired processing techniques, while the left channel and the right channel can be processed according to the stereo mid/side processing disclosed in one or more of FIGS. 1-6. The output of such a processing configuration will yield personalized left, center, and right channels for a user, as indicated by the dotted triangle in FIGS. 7A and 7B. Meanwhile, the left surround, right surround, and subwoofer channels (and the left back surround and right back surround channels in FIG. 7B) remain unprocessed, providing increased efficiency and reducing the computational power required to achieve personalized surround sound. Such an adjustment can be provided because in order to achieve detailed listening, human listeners are typically most sensitive to sound coming from the front, i.e. the left, center, and right channels, and are less sensitive to sound coming from behind and to the sides, i.e. the left surround, right surround, left back surround, right back surround channels. Many audio recordings that are played on surround sound systems follow such conventions as well, wherein dialog is provided in the center channel and other audio effects and background noises are provided in the remaining channels. Accordingly, only two personalization processing workflows are applied to three of the surround sound channels—a first personalization processing workflow can be applied to the center channel, while a second personalization processing workflow can be applied to the mid/side combination of the left channel and the right channel. Such a process can thereby yield the greatest processing savings in comparison to a full personalization processing over all surround sound channels, while also achieving nearly indistinguishable or even superior results in perceived audio quality and auditory experience of a listener.

While FIGS. 7A and 7B depict scenarios in which only three channels are processed, in some embodiments various other numbers and combinations of surround sound channels can be processed or personalized according to one or more aspects of the present disclosure.

Figure 8B:
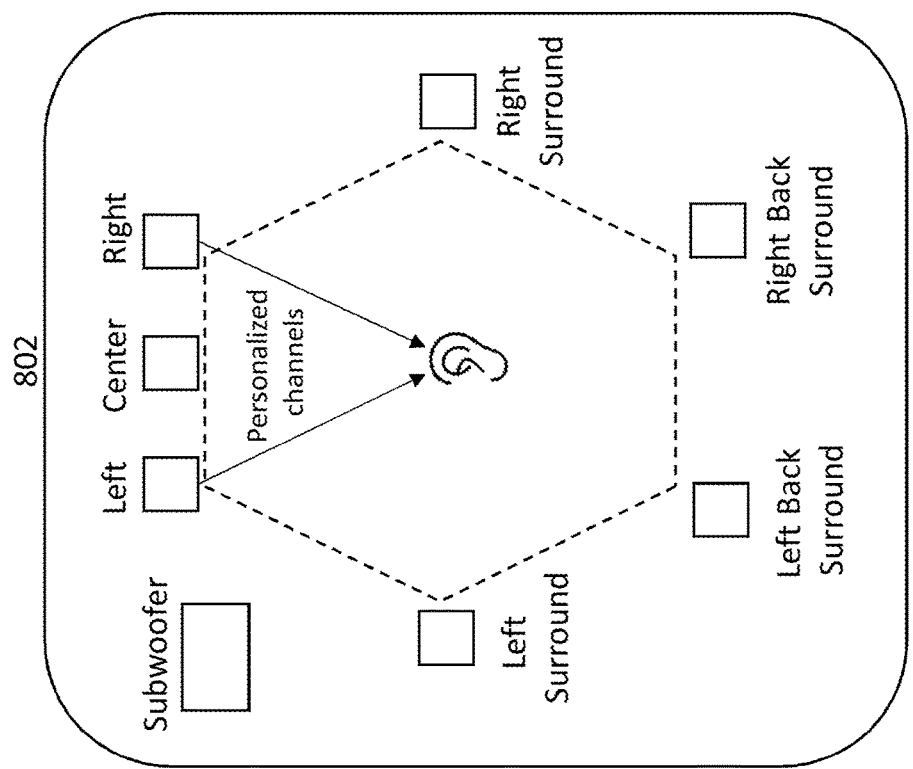
FIG. 8B illustrates a 7.1 surround sound processing configuration according to one or more aspects of the present disclosure.
Figure 8A:
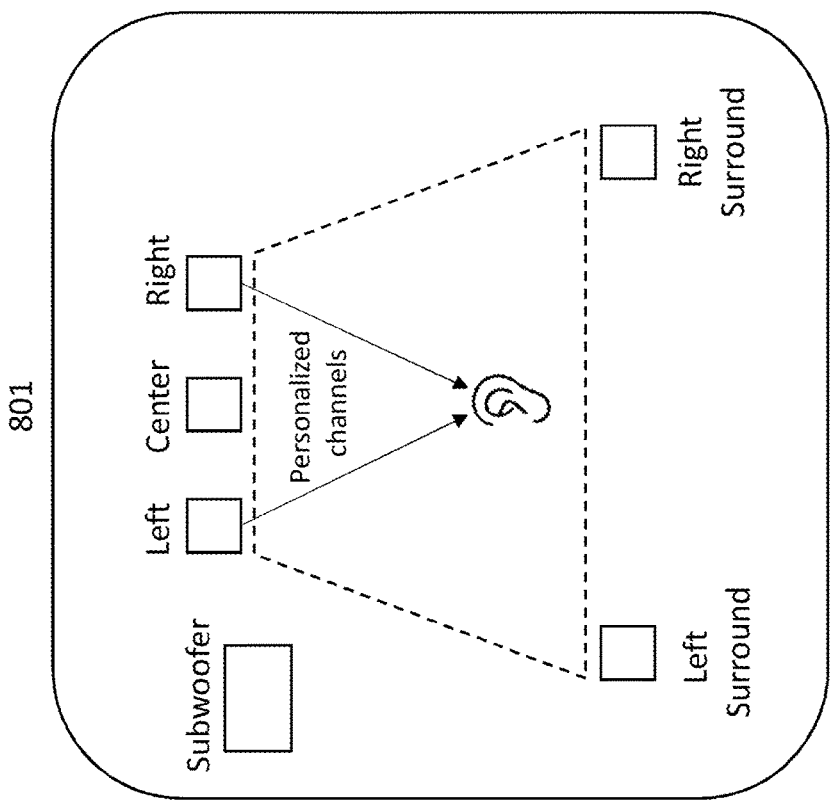
FIG. 8A illustrates a 5.1 surround sound processing configuration according to one or more aspects of the present disclosure.

For example, FIGS. 8A and 8B depict a 5.1 surround sound processing environment 801 in which five surround sound audio channels are processed, and a 7.1 surround sound processing environment 802 in which seven surround sound audio channels are processed. These surround sound processing environments 801 and 802 can be substantially similar or identical to the surround sound processing environments 701 and 702, respectively, or can be different. With respect to the 5.1 surround sound processing environment of FIG. 8A, here, a total of five surround sound audio channels are processed via three different personalization processing workflows. A first personalization processing workflow can be applied to the center channel, a second personalization processing workflow can be applied to the mid/side combination of the left channel and the right channel, and a third personalization processing workflow can be applied to the mid/side combination of the left surround channel and the right surround channel. One or more of the second and third personalization processing workflows can be performed according to one or more of the mid/side and other processing aspects disclosed herein, e.g. with respect to FIGS. 1-6.

With respect to the 7.1 surround sound processing environment of FIG. 8B, here, a total of seven surround sound audio channels are processed via four different personalization processing workflows. A first personalization processing workflow can be applied to the center channel, a second personalization processing workflow can be applied to the mid/side combination of the left channel and the right channel, a third personalization processing workflow can be applied to the mid/side combination of the left surround channel and the right surround channel, and a fourth personalization workflow can be applied to the mid/side combination of the left back surround channel and the right back surround sound channel. One or more of the second, third, and fourth personalization processing workflows can be performed according to one or more of the mid/side and other processing aspects disclosed herein, e.g. with respect to FIGS. 1-6.

Figure 9:
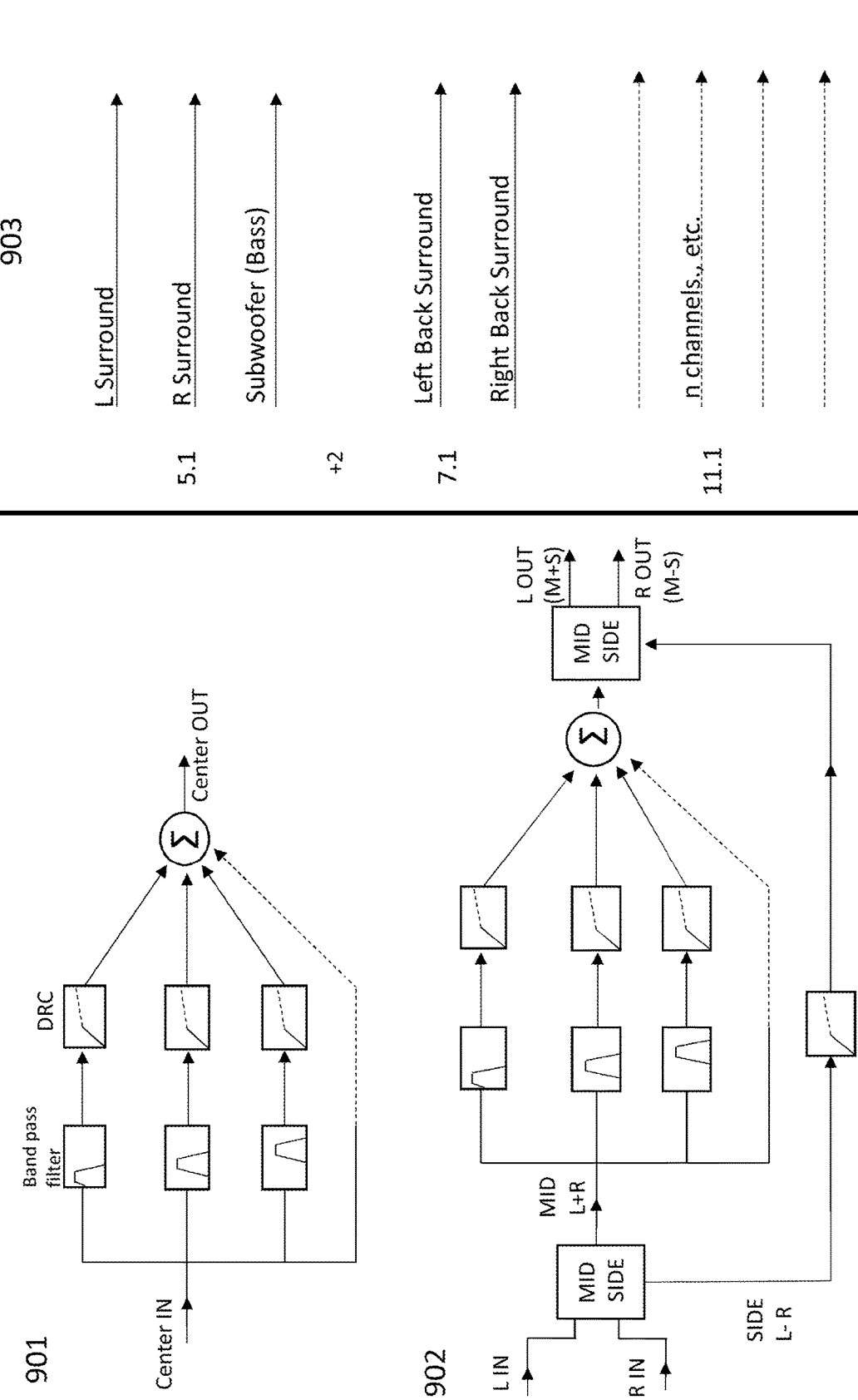
FIG. 9 illustrates an example surround sound processing flow according to one or more aspects of the present disclosure.

FIG. 9 illustrates an example multi-channel or surround sound processing workflow according to aspects of the present disclosure. In a first processing step 901, a center channel of a surround sound audio system (e.g. any of the 5.1 and 7.1 surround sound systems depicted in FIGS. 7A-8B, or some other desired surround sound system) is fully processed as desired, according to one or more known processing techniques and methodologies. For example, as shown, the center IN audio signal is divided into different frequencies or sub-bands via a series of band pass filters, and each sub-band is then processed with a DRC, which in some embodiments can be customized according to one or more aspects of that particular sub-band. First processing step 901 yields as output a processed center OUT audio signal.

In a second processing step 902 (which can be performed prior to, concurrent with, or subsequent to first processing step 901), a left channel and a right channel of the surround sound audio system are processed in the mid/side stereo processing fashion as disclosed herein with respect to one or more of FIGS. 1-6, in order to thereby yield a processed L OUT and a processed R OUT audio signal. In some embodiments, the input left and right channels can be the front left and front right channels, the left surround and right surround channels, the left back surround and right back surround channels, etc. according to the particular configuration of the surround sound environment in which these channels are provided.

Depending on the particular processing and personalization combinations desired, a third processing step 903 handles the remaining surround sound audio channels which are not to be processed, and outputs these unprocessed (or minimally processed) channels to their respective hardware element of the surround sound audio system. For example, in a 5.1 surround sound system, only the Center, Left, and Right channels might be processed (in steps 901 and 902, respectively), while the Left surround, Right surround, and Subwoofer channels are unprocessed, such that step 903 outputs to the respective hardware elements of the surround sound audio system a combined 5.1 surround sound audio signal where personalization has been performed on 3 channels. In a 7.1 surround sound system, a Left Back surround and a Right Back surround channel would also be present. In general, some number n of other surround sound channels can be present, depending on the desired surround sound configuration, without departing from the scope of the present disclosure.

Within the configurations variously depicted herein in FIGS. 2-6 and FIGS. 7A-9, each unprocessed signal pathway (i.e. a pathway not subject to band pass filtering) can be recombined with a processed signal pathway (i.e. a pathway subject to band pass filtering) such that the unprocessed signal pathway is delayed by the same amount of delay as is induced in the corresponding processed signal pathway(s), in order to thereby avoid phase distortion. In some embodiments, a phase correction network may be employed in the unprocessed signal pathway in order to match the phase distortion induced in the processed pathway.

The present disclosure solves the limitations of having to fully process both left and right channels with expensive sound augmentation methods, creating computationally efficient methods for stereo audio devices through mid/side processing techniques. The present disclosure has been explained with reference to specific embodiments, although these are not intended to be construed as limiting and other embodiments will be evident to those of ordinary skill in the art.

FIG. 10A and FIG. 10B illustrate example system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates an example computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output device 1065, such as a display, and can read and write information to storage device 1070, which can include magnetic media, and solid-state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that example systems 1000 and 1050 can have more than one processor 1010 or be part of a group or cluster of computing devices networked together to provide greater processing capability. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method of processing an audio signal for replay on an audio device, the method comprising:
    processing a center channel of a surround sound audio signal to thereby generate a processed center channel;
    processing one or more surround sound channel pairs, each pair comprising a left channel and a right channel of the surround sound audio signal, to thereby generate a corresponding one or more processed surround sound channel pairs, the processing for each surround sound channel pair comprising:
    encoding a mid channel by calculating the sum of the left and right channel of the surround sound channel pair;
    encoding a side channel by calculating the difference of the left and right channel of the surround sound channel pair;
    transmitting the side channel to a first signal pathway, wherein the first signal pathway includes a first dynamic range compressor and outputs a processed side channel as a first signal pathway output;
    transmitting the mid channel to a second signal pathway and performing a spectral decomposition of the mid channel into a plurality of sub-band signals, the spectral decomposition using at least one bandpass filter;
    processing the plurality of sub-band signals by:
        providing each sub-band signal to a dynamic range compressor (DRC) and compressing the sub-band signal;
        providing each compressed sub-band signal to a gain stage to thereby form a plurality of gain-adjusted sub-band signals;
        combining the plurality of gain-adjusted sub-band signals into a processed mid channel; and
        outputting the processed mid channel as a second signal pathway output;
    recombining the first and second signal pathway outputs; and
    decoding the recombination into a processed surround sound channel pair, the processed surround sound channel pair comprising a processed left channel and a processed right channel of the surround sound audio signal; and
    outputting the processed center channel and the one or more processed surround sound channel pairs.

2. The method of claim 1, wherein the one or more surround sound channel pairs include one or more of:
    a first surround sound channel pair, comprising a stereo left channel and a stereo right channel of the surround sound audio signal;
    a second surround sound channel pair, comprising a left surround channel and right surround channel of the surround sound audio signal; and
    a third surround sound channel pair, comprising a back left surround channel and a back right surround channel of the surround sound audio signal.

3. The method of claim 1, wherein processing the center channel of the surround sound audio signal comprises:
    performing spectral decomposition on the center channel, the spectral decomposition using at least one bandpass filter to divide the center channel into a plurality of sub-band signals; and
    processing the plurality of sub-band signals by:
        providing each sub-band signal to a dynamic range compressor (DRC) and compressing the sub-band signal;
        providing each compressed sub-band signal to a gain stage to thereby form a plurality of gain-adjusted sub-band signals; and
        combining the plurality of gain-adjusted sub-band signals into a processed center channel.

4. The method of claim 1, wherein the first signal pathway further includes a high-pass filter and a low-pass filter, wherein the high-pass filter is disposed before the first dynamic range compressor such that an output of the high-pass filter is input to the first dynamic range compressor.

5. The method of claim 4, wherein the high-pass filter is disposed on a first branch of the first signal pathway, and the low-pass filter is disposed on a second branch of the first signal pathway separate from the first branch.

6. The method of claim 5, wherein the high-pass filter has a cut-off frequency of 800 Hertz (Hz) and the low-pass filter has a cut-off frequency of 800 Hertz (Hz).

7. The method of claim 1, wherein the processing for one or more of the surround sound channel pairs further comprises performing wet/dry mixing of one or more of the side channel and the mid channel.

8. The method of claim 7, wherein wet/dry mixing of the side channel comprises:
    transmitting the side channel to a first dry signal pathway; and
    combining an unprocessed output from the first dry signal pathway with the processed output from the first signal pathway at a pre-defined ratio to thereby generate the first signal pathway output for recombination with the second signal pathway output.

9. The method of claim 7, wherein wet/dry mixing of the mid channel comprises:
    transmitting the mid channel to a second dry signal pathway; and
    combining an unprocessed output from the second dry signal pathway with the processed output from the second signal pathway at a pre-defined ratio to thereby generate the second signal pathway output for recombination with the first signal pathway output.

10. The method of claim 1, wherein the processing for one or more of the surround sound channel pairs further comprises performing wet/dry mixing of one or more of the corresponding left channel of the surround sound audio signal and the corresponding right channel of the surround sound audio signal.

11. The method of claim 10, wherein:
    wet/dry mixing of the left channel comprises:
        transmitting the left channel to a first dry signal pathway; and
        combining the output from the first dry signal pathway with the processed left audio signal at a pre-defined ratio; and
    wet/dry mixing of the right channel comprises:
        transmitting the right channel to a second dry signal pathway; and
        combining the output from the second dry signal pathway with the processed right audio signal at a pre-defined ratio.

12. The method of claim 1, wherein the audio device is one of: a hearable, a mobile phone, a television, a pair of headphones, an embedded audio system, and a sound reproduction system.

13. The method of claim 1, wherein:
    each given sub-band signal is provided to a DRC having one or more compression parameters uniquely corresponding to the given sub-band signal; and
    the one or more uniquely corresponding compression parameters are determined based on a hearing profile of an intended user of the audio device.

14. An audio output device comprising:
    at least one processor; and
    at least one memory storing instructions, which when executed cause the at least one processor to:

process a center channel of a surround sound audio signal to thereby generate a processed center channel;

process one or more surround sound channel pairs, each pair comprising a left channel and a right channel of the surround sound audio signal, to thereby generate a corresponding one or more processed surround sound channel pairs, the processing for each surround sound channel pair comprising:

encoding a mid channel by calculating the sum of the left and right channel of the surround sound channel pair;

encoding a side channel by calculating the difference of the left and right channel of the surround sound channel pair;

transmitting the side channel to a first signal pathway, wherein the first signal pathway includes a first dynamic range compressor and outputs a processed side channel as a first signal pathway output;

transmitting the mid channel to a second signal pathway and performing a spectral decomposition of the mid channel into a plurality of sub-band signals, the spectral decomposition using at least one bandpass filter;

processing the plurality of sub-band signals by:
providing each sub-band signal to a dynamic range compressor (DRC) and compressing the sub-band signal;
providing each compressed sub-band signal to a gain stage to thereby form a plurality of gain-adjusted sub-band signals;
combining the plurality of gain-adjusted sub-band signals into a processed mid channel; and
outputting the processed mid channel as a second signal pathway output;
recombining the first and second signal pathway outputs; and decode the recombination into a processed surround sound channel pair, the processed surround sound channel pair comprising a processed left channel and a processed right channel of the surround sound audio signal; and output the processed center channel and the one or more processed surround sound channel pairs.

15. The device of claim 14, wherein the one or more surround sound channel pairs include one or more of:

a first surround sound channel pair, comprising a stereo left channel and a stereo right channel of the surround sound audio signal;

a second surround sound channel pair, comprising a left surround channel and right surround channel of the surround sound audio signal; and a third surround sound channel pair, comprising a back left surround channel and a back right surround channel of the surround sound audio signal.

16. The device of claim 14, further comprising instructions which when executed cause the at least one processor to perform wet/dry mixing of the side channel by:

transmitting the side channel to a first dry signal pathway; and combining an unprocessed output from the first dry signal pathway with the processed output from the first signal pathway at a pre-defined ratio to thereby generate the first signal pathway output for recombination with the second signal pathway output.

17. The device of claim 14, further comprising instructions which when executed cause the at least one processor to perform wet/dry mixing of the mid channel by:

transmitting the mid channel to a second dry signal pathway; and combining an unprocessed output from the second dry signal pathway with the processed output from the second signal pathway at a pre-defined ratio to thereby generate the second signal pathway output for recombination with the first signal pathway output.

18. At least one non-transitory computer readable storage medium storing instructions, which when executed by at least one processor cause the at least one processor to perform actions comprising:

processing a center channel of a surround sound audio signal to thereby generate a processed center channel;

processing one or more surround sound channel pairs, each pair comprising a left channel and a right channel of the surround sound audio signal, to thereby generate a corresponding one or more processed surround sound channel pairs, the processing for each surround sound channel pair comprising:

encoding a mid channel by calculating the sum of the left and right channel of the surround sound channel pair;

encoding a side channel by calculating the difference of the left and right channel of the surround sound channel pair;

transmitting the side channel to a first signal pathway, wherein the first signal pathway includes a first dynamic range compressor and outputs a processed side channel as a first signal pathway output;

transmitting the mid channel to a second signal pathway and performing a spectral decomposition of the mid channel into a plurality of sub-band signals, the spectral decomposition using at least one bandpass filter;

processing the plurality of sub-band signals by:
providing each sub-band signal to a dynamic range compressor (DRC) and compressing the sub-band signal;
providing each compressed sub-band signal to a gain stage to thereby form a plurality of gain-adjusted sub-band signals;
combining the plurality of gain-adjusted sub-band signals into a processed mid channel; and
outputting the processed mid channel as a second signal pathway output;
recombining the first and second signal pathway outputs; and
decoding the recombination into a processed surround sound channel pair, the processed surround sound channel pair comprising a processed left channel and a processed right channel of the surround sound audio signal; and outputting the processed center channel and the one or more processed surround sound channel pairs.

19. The non-transitory computer readable storage medium of claim 18, wherein the one or more surround sound channel pairs include one or more of:

a first surround sound channel pair, comprising a stereo left channel and a stereo right channel of the surround sound audio signal;

a second surround sound channel pair, comprising a left surround channel and right surround channel of the surround sound audio signal; and a third surround sound channel pair, comprising a back left surround channel and a back right surround channel of the surround sound audio signal.

20. The non-transitory computer readable storage medium of claim 18, further comprising instructions which when executed cause the at least one processor to:
perform wet/dry mixing of the side channel by:
  transmitting the side channel to a first dry signal pathway; and
  combining an unprocessed output from the first dry signal pathway with the processed output from the first signal pathway at a pre-defined ratio to thereby generate the first signal pathway output for recombination with the second signal pathway output; and
perform wet/dry mixing of the mid channel by:
  transmitting the mid channel to a second dry signal pathway; and
  combining an unprocessed output from the second dry signal pathway with the processed output from the second signal pathway at a pre-defined ratio to thereby generate the second signal pathway output for recombination with the first signal pathway output.

* * * * *